(12) United States Patent  (10) Patent No.: US 8,879,220 B2
Lin et al.  (45) Date of Patent: Nov. 4, 2014

(54) ELECTROSTATIC DISCHARGE PROTECTION CIRCUIT

(75) Inventors: Yuan-Tsung Lin, New Taipei (TW); Te-Chang Wu, Hsinchu County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 868 days.

(21) Appl. No.: 13/091,106

(22) Filed: Apr. 20, 2011

(65) Prior Publication Data
US 2012/0268848 A1  Oct. 25, 2012

(51) Int. Cl.
*H02H 9/00* (2006.01)
*H02H 9/04* (2006.01)

(52) U.S. Cl.
CPC ..................... *H02H 9/046* (2013.01)
USPC .......................................................... 361/56

(58) Field of Classification Search
USPC .......................................................... 361/56
See application file for complete search history.

(56) References Cited

U.S. PATENT DOCUMENTS

| | | | |
|---|---|---|---|
| 6,909,149 B2 | 6/2005 | Russ | |
| 7,586,721 B2 * | 9/2009 | Wang et al. | 361/56 |
| 7,593,202 B2 * | 9/2009 | Khazhinsky et al. | 361/56 |
| 7,672,100 B2 | 3/2010 | Van Camp | |
| 2003/0076636 A1 | 4/2003 | Ker | |
| 2003/0214773 A1 * | 11/2003 | Kitagawa | 361/118 |
| 2004/0027742 A1 * | 2/2004 | Miller et al. | 361/52 |
| 2005/0286186 A1 * | 12/2005 | Chang | 361/56 |
| 2006/0181823 A1 * | 8/2006 | Miller et al. | 361/56 |
| 2006/0203405 A1 * | 9/2006 | Bhattacharya et al. | 361/91.1 |
| 2010/0271736 A1 * | 10/2010 | Rien et al. | 361/18 |
| 2011/0267723 A1 * | 11/2011 | Stockinger et al. | 361/56 |
| 2012/0268848 A1 * | 10/2012 | Lin et al. | 361/56 |

* cited by examiner

*Primary Examiner* — Ronald W Leja
(74) *Attorney, Agent, or Firm* — Winston Hsu; Scott Margo

(57) ABSTRACT

The present invention provides an electrostatic discharge (ESD) protection circuit including an ESD detection circuit and a plurality of power clamp circuits. The ESD detection circuit is electrically connected to a first high power line, a second high power line and at least one low power line, and is used to detect an ESD event occurring in the first high power line and another ESD event occurring in the second high power line. The ESD detection circuit includes a first trigger unit and a second trigger unit, electrically connected to the first high power line and the second high power line respectively. Each power clamp circuit has a trigger node, and the trigger nodes are electrically connected to the first trigger unit and the second trigger unit.

18 Claims, 5 Drawing Sheets

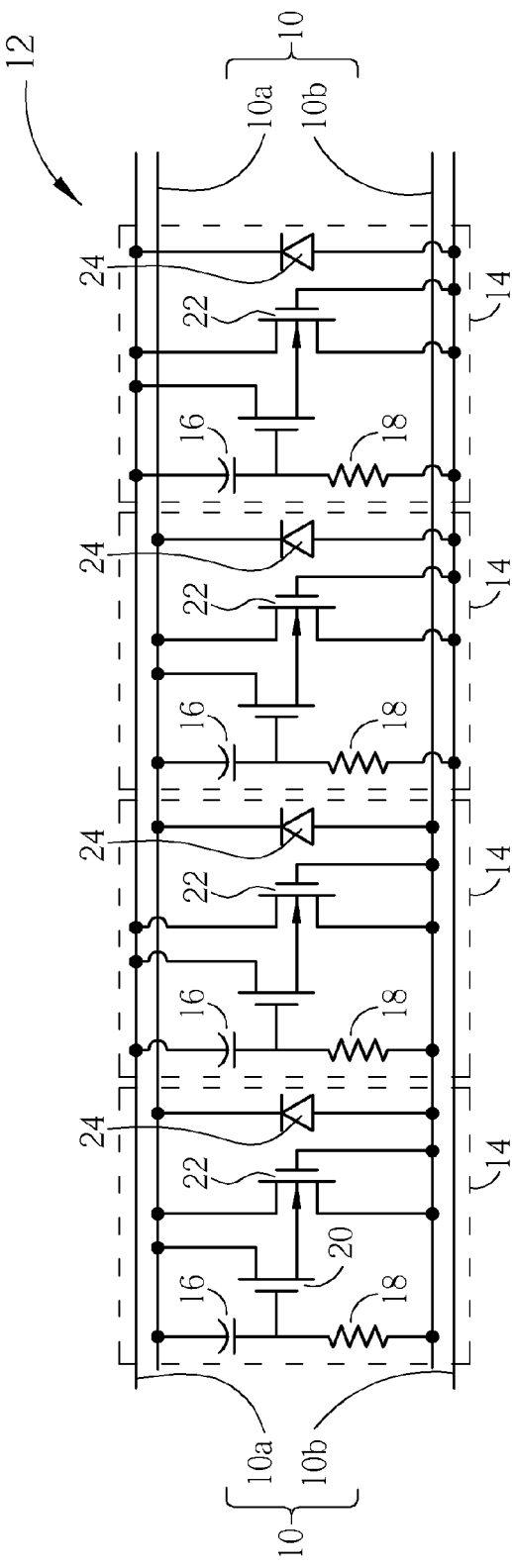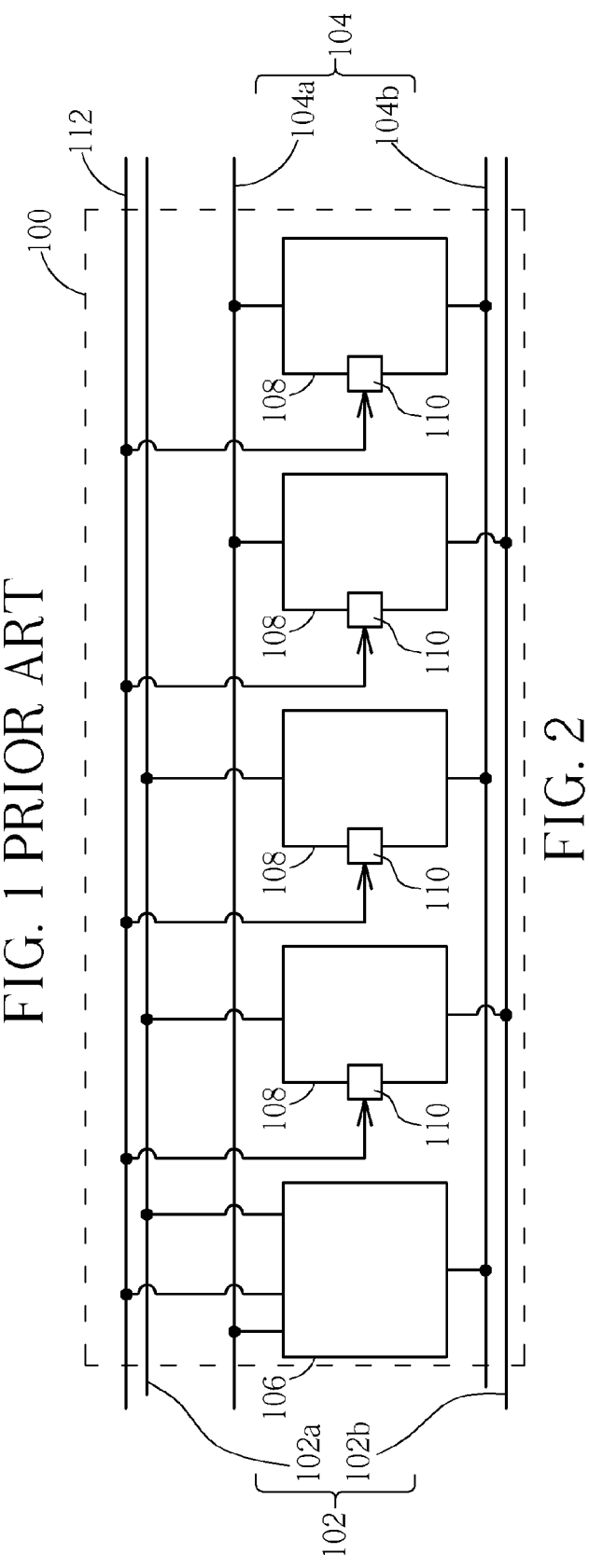
FIG. 1 PRIOR ART
FIG. 2

ELECTROSTATIC DISCHARGE PROTECTION CIRCUIT

BACKGROUND OF THE INVENTION

1. Field of the Invention

The present invention relates to an electrostatic discharge (ESD) protection circuit, and more particularly, to an ESD protection circuit used for protecting an integral circuit electrically connected to at least two power sources.

2. Description of the Prior Art

With the advancement of technology, the development of semiconductor processes is ongoing. A modern chip is allowed to have a plurality of various electronic circuits configured within. Recently, the chip of integrated circuit can be divided into a core circuit and an input/output (I/O) circuit, and the core circuit and the I/O circuit are respectively driven by different power sources with different voltages. In order to receive the external power sources by the core circuit and the I/O circuit, the chip of the integrated circuit has core power pads and I/O power pad disposed thereon.

However, during processes such as packaging, testing, delivering, and manufacturing, etc., the pads easily transfer electrostatic charges that are not suitable for the chip to the inner circuit in the chip, and further, the electrostatic charges damage the inner circuit in the chip. The unwanted condition causing the inner circuits of the chip to be damaged is called electrostatic discharge (ESD). Therefore, an ESD protection circuits used for protecting integrated circuit chip from being damaged by the unwanted ESD become more important with the advancement of the semiconductor processes.

Refer to FIG. 1, which is a circuit diagram illustrating an ESD protection circuit used for protecting an integrated circuit electrically connected to two power sources according to the prior art. As shown in FIG. 1, each power source 10 has a high power line 10a and a low power line 10b respectively. An ESD event may occur in each high power line 10a and each low power line 10b, and ESD current may flow toward other high power lines 10a and other low power lines 10b. In order to protect an integrated circuit electrically connected to the two power sources 10, the ESD protection circuit 12 of the prior art is electrically connected to the power sources 10, and includes four power clamp circuits 14 that are electrically connected between each high power line 10a and each low power line 10b respectively. Furthermore, each power clamp circuit 14 includes a capacitor 16, a resistor 18, a first n-type metal-oxide-semiconductor (NMOS) transistor 20, a second NMOS transistor 22, and a diode 24. Each capacitor 16 is electrically connected between the corresponding high power line 10a and a gate of each first NMOS transistor 20, and each resistor 18 is electrically connected between the corresponding low power line 10b and the gate of each first NMOS transistor 20. Accordingly, in each power clamp circuit 14, when the ESD event occurs in the high power line 10a, a RC circuit composed of the capacitor 16 and the resistor 18 can provide a high voltage potential to the gate of the first NMOS transistor 20 so as to turn on the first NMOS transistor 20. Furthermore, a drain and a source of each first NMOS transistor 20 are electrically connected to the corresponding high power line 10a and a body of each second NMOS transistor 22 respectively. When the first NMOS transistor 20 is turned on, electrostatic charges occurring in the high power line 10a can flow through the first NMOS transistor 20 to trigger on the second NMOS transistor 22, and the second NMOS transistor 22 is turned on. A drain and a source of each second NMOS transistor 22 are electrically connected to the corresponding high power line 10a and the corresponding low power line 10b respectively, and a gate of each second NMOS transistor 22 is electrically connected to the corresponding low power line 10b. When the second NMOS transistor 22 is turned on, the electrostatic charges occur in the high power line 10a can flow through the second NMOS transistor 22, and is introduced to the low power line 10b. Accordingly, the electrostatic charges in the high power line 10a can be introduced to the low power line 10b. Furthermore, an anode and a cathode of each diode 24 are electrically connected to the corresponding low power line 10b and the corresponding high power line 10a, so that an ESD event occurring in the low power line 10b can be introduced to the high power line 10a.

As the above-mentioned description, each high power line 10a and each low power line 10b require a power clamp circuit 14 electrically connected between them to introduce the electrostatic charges occurring in each high power line 10a, and each power clamp circuit 14 require a capacitor 16 and a resistor 18 to be a detection circuit used for detecting the electrostatic charges occurring in each high power line 10a so as to provide high voltage potential to the gate of the first NMOS transistor 20. For this reason, when the number of the power sources is two, four power clamp circuits 14 are required to protect the integrated circuit electrically connected between the power sources. When the number of the power sources is added to be three, the number of the power clamp circuit 14 should be added to be nine, so that nine capacitors 16 and nine resistors 18 should be increased to be detection circuits. However, in the chip of the integrated circuit of the prior art, the capacitors 16 and the resistors 18 occupy a certain proportion of the area of the chip. Thus, when the chip of the integrated circuit requires more power sources 10, the number of the capacitor 16 and resistor 18 in the ESD protection circuit 12 is accordingly increased, and the size of the chip of the integrated circuit is limited by the capacitors 16 and the resistors 18.

Therefore, it is an important objective to reduce the number of the capacitor and the resistor in the ESD protection circuit.

SUMMARY OF THE INVENTION

It is therefore an objective of the present invention to provide an electrostatic discharge (ESD) protection circuit to reduce the number of the capacitor and the resistor.

According to an embodiment of the present invention, an ESD protection circuit is disclosed. The ESD protection circuit is electrically connected to at least two power sources, and the power sources includes a first high power line, a first low power line, a second high power line, and a second low power line. The ESD protection circuit includes an ESD detection circuit and a plurality of power clamp circuits. The ESD detection circuit is electrically connected to the first high power line, the second high power line and at least one of the first low power line and the second low power line and used to detect an ESD event occurring in the first high power line and another ESD event occurring in the second high power line, and the ESD detection circuit includes a first trigger unit, and a second trigger unit, electrically connected to the first high power line and the second high power line respectively. The power clamp circuits are electrically connected to the power sources, and each power clamp circuit has a trigger node respectively, wherein the trigger nodes are electrically connected to the first trigger unit and the second trigger unit.

The ESD protection circuit of the present invention disposes one ESD detection circuit outside the power clamp circuits to prevent the size of the integrated circuit from being limited by increasing the number of the power clamp circuits 108.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a circuit diagram illustrating an ESD protection circuit used for protecting an integrated circuit electrically connected to two power sources according to the prior art.

FIG. 2 is a circuit diagram illustrating an electrostatic discharge protection circuit according to a first preferred embodiment of the present invention.

DETAILED DESCRIPTION

Figure 3:
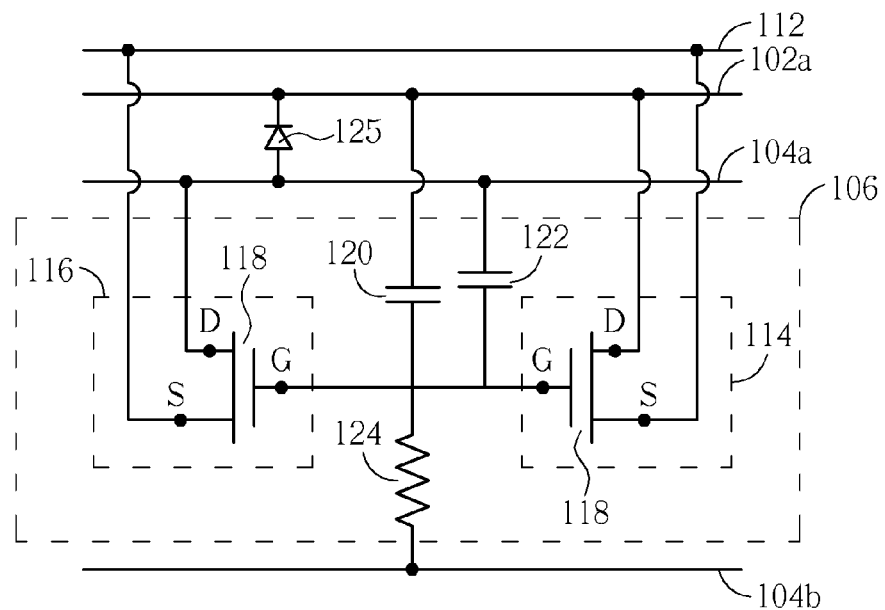
FIG. 3 is a schematic diagram illustrating the ESD detection circuit according to the first preferred embodiment of the present invention.

Refer to FIG. 2, which is a circuit diagram illustrating an electrostatic discharge protection circuit according to a first preferred embodiment of the present invention. As shown in FIG. 2, the ESD protection circuit 100 is electrically connected to at least two power sources 102, 104 and used to protect any kind of ESD modes occurring in the power sources 102. The power sources 102, 104 include a first power source 102 and a second power source 104. The first power source 102 has a first high power line 102a and a second low power line 102b, and the second power source 104 has a second high power line 104a and a second low power line 104b. In this embodiment, the first high power line 102a provides a first voltage, such as 2.5 volts or 3.3 volts, and the first low power line 102b is a ground terminal, so that the first power source 102 can be used to drive an input/output (I/O) circuit. The second high power line 104a provides a second voltage, such as 1.0 volts, and the second low power line 104b is another ground terminal. The first voltage is larger than the second voltage, so that the second power source 104 can be used to drive a core circuit that has a voltage tolerance lower than that of the I/O circuit. The first high power line 102a and the second voltage 104a of the present invention are not limited to provide the above-mentioned voltages. Furthermore, the ESD protection circuit 100 includes an ESD detection circuit 106 and a plurality of power clamp circuits 108. Each power clamp circuit 108 has a trigger node 110 respectively, and each power clamp circuit 108 is used to introduce electrostatic charges occurring in the first high power line 102a and the second high power line 104a to the first low power line 102b and the second low power line 104b. The ESD detection circuit 106 is electrically connected to the first high power line 102a, the second power line 104a, at least one of the first low power line 102b and the second low power line 104b and the trigger nodes 110, and used to detect an ESD event occurring in the first high power line 102a and another ESD event occurring in the second high power line 104a. Furthermore, the ESD protection circuit 100 further includes a connecting line 112, used to electrically connect the ESD detection circuit 106 and the trigger nodes 110 of the power clamp circuits 108. Accordingly, a trigger signal generated from the ESD detection circuit 106 can be transferred to each power clamp circuit 108, and each power clamp circuit 108 can be turned on.

Refer to FIG. 3, and refer to FIG. 2 together. FIG. 3 is a schematic diagram illustrating the ESD detection circuit according to the first preferred embodiment of the present invention. As shown in FIG. 2 and FIG. 3, the ESD detection circuit 106 includes a first trigger unit 114 and a second trigger unit 116. The first trigger unit 114 is electrically connected to the first high power line 102a and the trigger nodes 110, and the first trigger unit 114 provides a first trigger signal to the connecting line 112 when the ESD detection circuit 106 detect the ESD event occurring in the first high power line 102a. Accordingly, the power clamp circuits 108 electrically connected to the connecting line 112 can be triggered by the first trigger signal to turn on, and then, the power clamp circuits 108 can provide ESD paths to discharge the electrostatic charges in the first high power line 102a. Furthermore, the second trigger unit 116 is electrically connected to the second high power line 104a and the trigger nodes 110, and the second trigger unit 116 provides a second trigger signal to the connecting line 112 when the ESD detection circuit 106 detect the ESD event occurring in the second high power line 104a. Accordingly, the power clamp circuits 108 electrically connected to the connecting line 112 can be triggered by the second trigger signal to turn on, and then, the power clamp circuits 108 can provide ESD paths to discharge the electrostatic charges in the second high power line 104a. In this embodiment, the first trigger unit 114 and the second trigger unit 116 can be first n-type metal-oxide-semiconductor (NMOS) transistors 118 respectively. Gates G of the first NMOS transistors 118 are electrically connected to each other, and drains D of the first NMOS transistors 118 are electrically connected to the first high power line 102a and the second high power line 104a respectively. Sources S of the first NMOS transistors 118 are electrically connected to the connecting line 112 so as to electrically connect the trigger nodes 110. In addition, the ESD detection circuit 106 further includes a first capacitor 120, a second capacitor 122 and a first resistor 124, and is used to detect the ESD event occurring in the first high power line 102a and the ESD event occurring in the second high power line 104a. The first capacitor 120 is electrically connected between the first high power line 102a and the gates G of the first NMOS transistors 118, and the second capacitor 122 is electrically connected between the second high power line 104a and the gates of the first NMOS transistors 118. The first resistor 124 is electrically connected between the gates G of the first NMOS transistors 118 and the second low power line 104b.

In other embodiments of the present invention, the first resistor 124 also can be electrically connected between the gates G of the first NMOS transistors 118 and the first low power line 102b. Or, besides the first resistor 124 is electrically connected between the gates G of the first NMOS transistors 118 and the second low power line 104b, the ESD detection circuit 106 can further include a resistor electrically connected between the gates G of the first NMOS transistors 118 and the first low power line 102b.

Thus, the first capacitor 120 and the first resistor 124 can constitute a RC circuit electrically connected between the first high power line 102a and the second low power line 104b. When the ESD event occurs in the first high power line 102a, the electrostatic charges raises the potential of the gates G of the first NMOS transistors 118 through the first capacitor 120, and the first NMOS transistors 118 are turned on. Accordingly, the electrostatic charges can be introduced from the first high power line 102a to the connecting line 112 so as to trigger each power clamp circuit 108. Similarly, the second capacitor 122 and the first resistor 124 constitute anther RC circuit electrically connected between the second high power line 104a and the second low power line 104b. When the ESD event occurs in the second high power line 104a, the first NMOS transistors 118 are turned on. Accordingly, the electrostatic charges can be introduced from the second high power line 102a to the connecting line 112 so as to trigger each power clamp circuit 108. Moreover, the ESD detection circuit 106 of this embodiment further includes a first diode 125, and an anode and a cathode of the first diode 125 are electrically connected to the second high power line 104a and the first high power line 102a respectively so as to raise an ESD ability of the electrostatic charges in the second high power line 104a and effectively protect the core circuit having lower voltage tolerance from being damaged.

In other embodiments of the present invention, the ESD protection circuit 100 can further include two diodes. An anode and a cathode of one of the diodes are electrically connected to the first high power line 102a and the second high power line 104a respectively, and an anode and a cathode of the other of the diodes are electrically connected to the second high power line 104a and the first high power line 102a respectively, so that the electrostatic charges in the first high power line 102a or the second high power line 104a can be introduced to the second high power line 104a or the first high power line 102a. In addition, the ESD protection circuit 100 can further include two diodes. An anode and a cathode of one of the diodes are electrically connected to the first low power line 102b and the second low power line 104b respectively, and an anode and a cathode of the other one of the diodes are electrically connected to the second low power line 104b and the first low power line 102b respectively, so that the electrostatic charges in the first low power line 102b or the second low power line 104b can be introduced to the second low power line 104b or the first low power line 102b.

Figure 4:
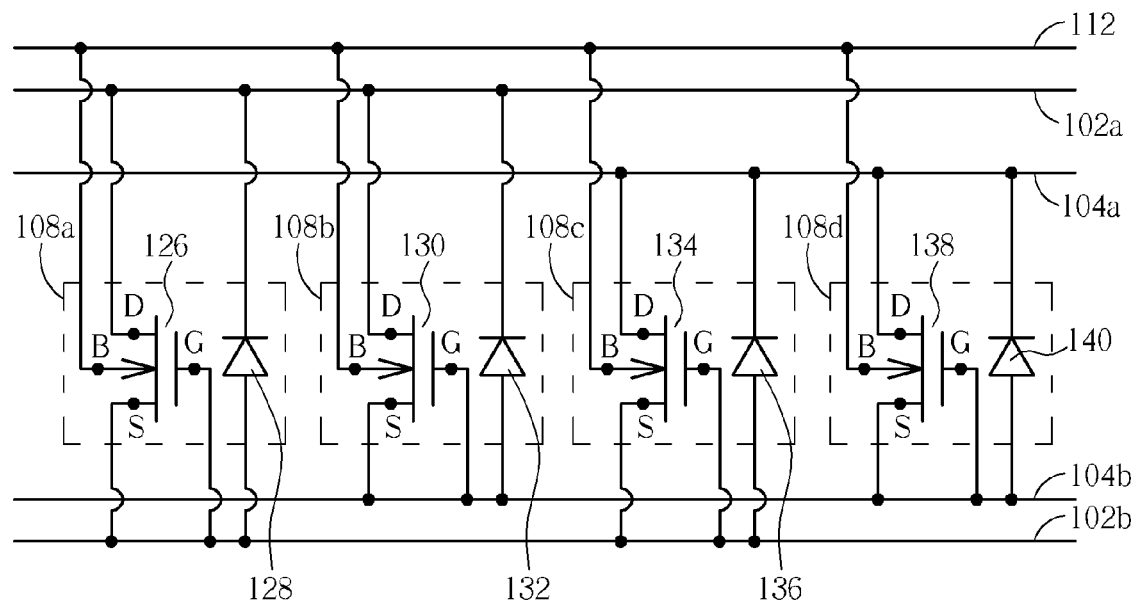
FIG. 4 is a schematic diagram illustrating the power clamp circuits according to the first preferred embodiment of the present invention.

Refer to FIG. 4, and refer to FIG. 2 together. FIG. 4 is a schematic diagram illustrating the power clamp circuits according to the first preferred embodiment of the present invention. As shown in FIG. 2 and FIG. 4, the power clamp circuits 108 of this embodiment includes a first power clamp circuit 108a, a second power clamp circuit 108b, a third power clamp circuit 108c, and a fourth power clamp circuit 108d. The first power clamp circuit 108a is electrically connected between the first high power line 102a and the first low power line 102b and used to provide two ESD paths that are respectively from the first high power line 102a to the first low power line 102b and from the first low power line 102b to the first high power line 102a. The second power clamp circuit 108b is electrically connected between the first high power line 102a and the second low power line 104b and used to provide two ESD paths that are respectively from the first high power line 102a to the second low power line 104b and from the second low power line 104b to the first high power line 102a. The third power clamp circuit 108c is electrically connected between the second high power line 104a and the first low power line 102b and used to provide two ESD paths that are respectively from the second high power line 104a to the first low power line 102b and from the first low power line 102b to the second high power line 104a. The fourth power clamp circuit 108d is electrically connected between the second high power line 104a and the second low power line 104b and used to provide two ESD paths that are respectively from the second high power line 104a to the second low power line 104b and from the second low power line 104b to the second high power line 104a. Accordingly, the first power clamp circuit 108a, a second power clamp circuit 108b, a third power clamp circuit 108c and a fourth power clamp circuit 108d can protect the integrated circuit electrically connected to the first high power line 102a, the first low power line 102b, the second high power line 104a and the second low power line 104b.

The first power clamp circuit 108a includes a third metal-oxide-semiconductor (MOS) transistor 126 and a second diode 128, and the second power clamp circuit 108b includes a fourth MOS transistor 130 and a third diode 132. Also, the third power clamp circuit 108c includes a fifth MOS transistor 134 and a fourth diode 136, and the fourth power clamp circuit 108d includes a sixth MOS transistor 138 and a fifth diode 140. In this embodiment, the third MOS transistor 126, the fourth MOS transistor 130, the fifth MOS transistor 134 and the sixth MOS transistor 138 are NMOS transistors respectively. In addition, a source S and a gate G of the third NMOS transistor 126 are electrically connected to the first low power line 102b, and a drain D of the third NMOS transistor 126 is electrically connected to the first high power line 102a. A source S and a gate G of the fourth NMOS transistor 130 are electrically connected to the second low power line 104b, and a drain D of the fourth NMOS transistor 130 is electrically connected to the first high power line 102a. A source S and a gate G of the fifth NMOS transistor 134 are electrically connected to the first low power line 102b, and a drain D of the fifth NMOS transistor 134 is electrically connected to the second high power line 104a. A source S and a gate G of the sixth NMOS transistor 138 are electrically connected to the second low power line 104b, and a drain D of the sixth NMOS transistor 138 is electrically connected to the second high power line 104a. Accordingly, the electrostatic charges in the first high power line 102a can be introduced to the first low power line 102b through turning on the third NMOS transistor 126 and be introduced to the second low power line 104b through turning on the fourth NMOS transistor 130, and the electrostatic charges in the second high power line 104a can be introduced to the first low power line 102b through turning on the fifth NMOS transistor 134 and be introduced to the second low power line 104b through turning on the sixth NMOS transistor 138. The third MOS transistor 126, the fourth MOS transistor 130, the fifth MOS transistor 134 and the sixth MOS transistor 138 of the present invention are not limited to be the NMOS transistors, and also can be p-type MOS (PMOS) transistors. If the third MOS transistor 126, the fourth MOS transistor 130, the fifth MOS transistor 134 and the sixth MOS transistor 138 are PMOS transistors, the source and the gate of each PMOS transistor are electrically connected to the corresponding high power line, and the drain of each PMOS transistor is electrically connected to the corresponding low power line.

In this embodiment, the trigger node 110 of the first power clamp circuit 108a is a body B of the third NMOS transistor 126, and the trigger node 110 of the second power clamp circuit 108b is a body of the fourth NMOS transistor 130. The trigger node 110 of the third power clamp circuit 108c is a body of the fifth NMOS transistor 134, and the trigger node 110 of the fourth power clamp circuit 108d is a body of the sixth NMOS transistor 138. That is, the third NMOS transistor 126, the fourth NMOS transistor 130, the fifth NMOS transistor 134 and the sixth NMOS transistor 138 are substrate-triggered transistors, but are not limited herein. In addition, the third NMOS transistor 126 and the fourth NMOS transistor 130 are used to tolerate the first voltage provided from the first high power line 102a. In other words, in order to prevent the core circuit electrically connected to a voltage the same as the voltage that is provided to the third NMOS transistor 126 and the fourth NMOS transistor 130 from being damaged by the electrostatic charges, thicknesses of gate oxide layers of the third NMOS transistor 126 and the fourth NMOS transistor 130 are the same and should be designed according to the first voltage provided by the first high power line 102a. Similarly, the fifth NMOS transistor 134 and the sixth NMOS transistor 138 are used to tolerate the second voltage provided from the second high power line 104a. In other words, in order to prevent the I/O circuit electrically connected to a voltage the same as the voltage that is provided to the fifth NMOS transistor 134 and the sixth NMOS transistor 138 from being damaged by the electrostatic charges, thicknesses of gate oxide layers of the fifth NMOS transistor 134 and the sixth NMOS transistor 138 are the same and should be designed according to the second voltage provided by the second high power line 104a.

Furthermore, an anode and a cathode of the second diode 128 are electrically connected to the first low power line 102b and the first high power line 102a respectively, and an anode and a cathode of the third diode 132 are electrically connected to the second low power line 104b and the first high power line 102a respectively. An anode and a cathode of the fourth diode 136 are electrically connected to the first low power line 102b and the second high power line 104a respectively, and an anode and a cathode of the fifth diode 140 are electrically connected to the second low power line 104b and the second high power line 104a respectively. Accordingly, the electrostatic charges in the first low power line 102b can be introduced to the first high power line 102a and the second high power line 104a respectively through the second diode 128 and the fourth diode 136, and the electrostatic charges in the second low power line 104b can be introduced to the first high power line 102a and the second high power line 104a respectively through the third diode 132 and the fifth diode 140.

As the above-mentioned description, the ESD protection circuit 100 of this embodiment is electrically connected to at least two power source 102, 104, and the ESD detection circuit 106 is disposed outside the power clamp circuits 108. For this reason, the size of the integrated circuit can be prevented from being limited by increasing the number of the power clamp circuits 108. In addition, the ESD detection circuit 106 of this embodiment disposes the first trigger unit 114 and the second trigger unit 116 that generate trigger signals respectively for each power source 102, 104, and the trigger signals are transferred to each power clamp circuit 108 through the connecting line 112. Therefore, the power clamp circuits 108 can be turned on to discharge electrostatic charges and protect the core circuit and the I/O circuit electrically connected to different voltages respectively.

The ESD detection circuit and the power clamp circuits of the present invention are not limited to the above-mentioned embodiment. The following description continues to detail the other embodiments or modifications, and in order to simplify and show the difference between the other embodiments or modifications and the above-mentioned embodiment, the same numerals denote the same components in the following description, and the same parts are not detailed redundantly.

Figure 5:
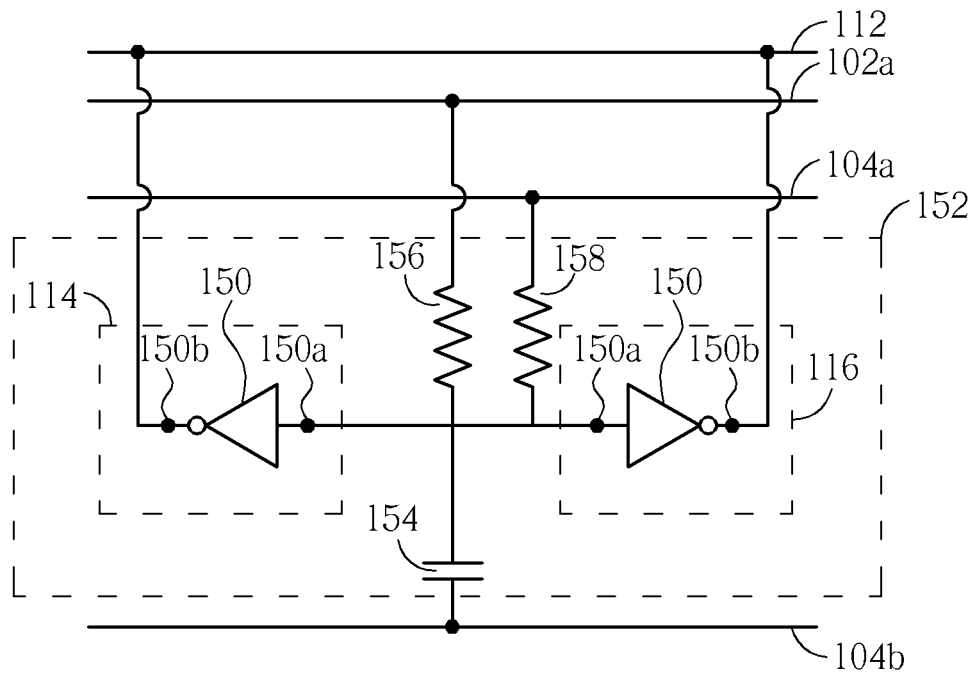
FIG. 5 is a schematic diagram illustrating an ESD detection circuit according to a second preferred embodiment of the present invention.

Refer to FIG. 5, which is a schematic diagram illustrating an ESD detection circuit according to a second preferred embodiment of the present invention. As shown in FIG. 5, as compared with the first preferred embodiment, the first trigger unit 114 and the second trigger unit 116 of this embodiment are respectively inverters 150, and each inverter has an input terminal 150a and an output terminal 150b. Furthermore, the input terminals 150a of the inverters 150 are electrically connected to each other, and the output terminals 150b of the inverters 150 are electrically connected to the connecting line 112. In addition, the ESD detection circuit 150 of this embodiment includes a third capacitor 154, a second resistor 156 and a third resistor 158. The third capacitor 154 is electrically connected between the input terminals 150a and the second low power line 104b. The second resistor 156 is electrically connected between the first high power line 102a and the input terminals 150a, and the third resistor 158 is electrically connected between the second high power line 104a and the input terminals 150a.

Figure 6:
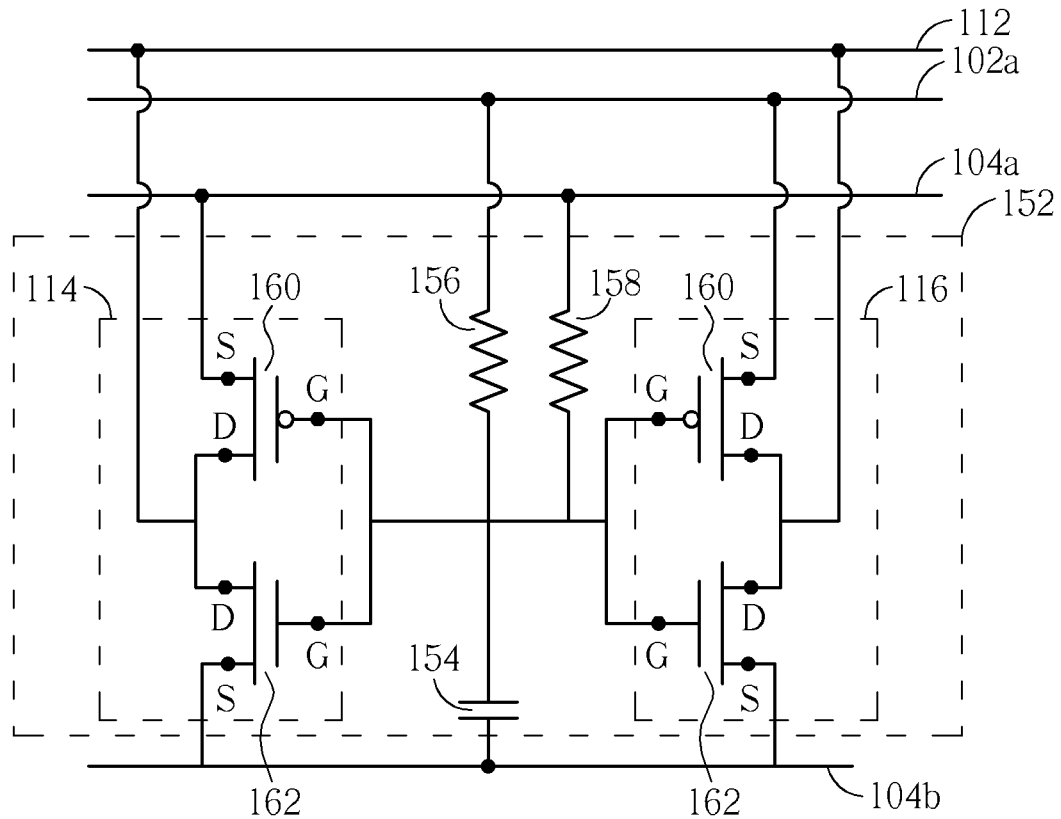
FIG. 6 is a schematic diagram illustrating an example of the ESD detection circuit according to the second preferred embodiment of the present invention.

In order to detail the inverter of the present invention, refer to FIG. 6, and refer to FIG. 5 together. FIG. 6 is a schematic diagram illustrating an example of the ESD detection circuit according to the second preferred embodiment of the present invention. As shown in FIG. 5 and FIG. 6, each inverter 150 of this example includes a PMOS transistor 160 and a second NMOS transistor 162. A gate G of each PMOS transistor 160 is electrically connected to a gate G of each second NMOS transistor 162, and the gates G of the PMOS transistors 160 are electrically connected to each other and respectively regarded as the input terminals 150a. Furthermore, the third capacitor 154 is electrically connected between the gates G of the PMOS transistors 160 and the second low power line 104b. The second resistor 156 is electrically connected between the gates G of the PMOS transistors 160 and the first high power line 102a, and the third resistor 158 is electrically connected between the gates G of the PMOS transistors 160 and the second high power line 104a. A drain D of each PMOS transistor 160 is electrically connected to a drain D of each second NMOS transistor 162 respectively, and the drains D of the PMOS transistors 160 are regarded as the input terminals 150b respectively. The drains D of the PMOS transistors 160 are electrically connected to the connecting line 112. Furthermore, sources S of the PMOS transistors 160 are electrically connected to the first high power line 102a and the second high power line 104a respectively, and sources S of the second NMOS transistors 162 are electrically connected to the second low power line 104b. In other embodiments of the present invention, the third capacitor 154 also can be electrically connected between the gates G of the PMOS transistors 160 and the first low power line 102b, and the sources S of the second NMOS transistors 162 are electrically connected to the first low power line 102b.

In this embodiment, when the ESD event occurs in the first high power line 102a, potentials of the gates G of the PMOS transistors 160 are in a low potential, and thus, the PMOS transistors 160 are turned on. Accordingly, the PMOS transistor 160 electrically connected to the first high power line 102a can introduce the electrostatic charges to the connecting line 112 so as to trigger the power clamp circuits 108. Similarly, when the ESD event occurs in the second high power line 104a, potentials of the gates G of the PMOS transistors 160 are in a low potential and are accordingly turned on. The electrostatic charges in the second high power line 104a can be introduced to the connecting line 112, and thus, the power clamp circuits 108 are triggered on.

Figure 7:
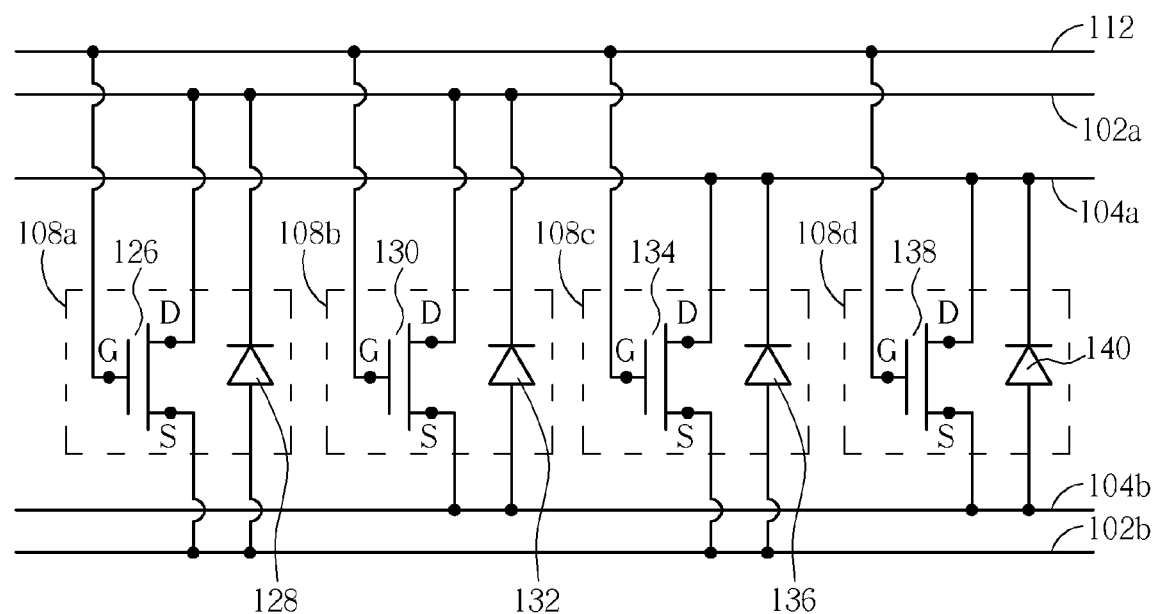
FIG. 7 is a schematic diagram illustrating the power clamp circuit according to the second preferred embodiment of the present invention.

Refer to FIG. 7, which is a schematic diagram illustrating the power clamp circuit according to the second preferred embodiment of the present invention. As shown in FIG. 7, as compared with the first preferred embodiment, in this embodiment, the trigger node 110 of the first power clamp circuit 108a is the gate G of the third NMOS transistor 126, and the trigger node 110 of the second power clamp circuit 108b is the gate G of the fourth NMOS transistor 130. The trigger node 110 of the third power clamp circuit 108c is the gate G of the fifth NMOS transistor 134, and the trigger node 110 of the fourth power clamp circuit 108d is the gate G of the sixth NMOS transistor 138.

Furthermore, the ESD protection circuit of the present invention is not limited to be the above-mentioned embodiments. In other embodiments of the present invention, the ESD protection circuit also can be the ESD detection circuit in the first preferred embodiment combined with the power clamp circuits in the second preferred embodiment. Or, the ESD protection circuit can be the ESD detection circuit in the second preferred embodiment combined with the power clamp circuits in the first preferred embodiment.

Figure 8:
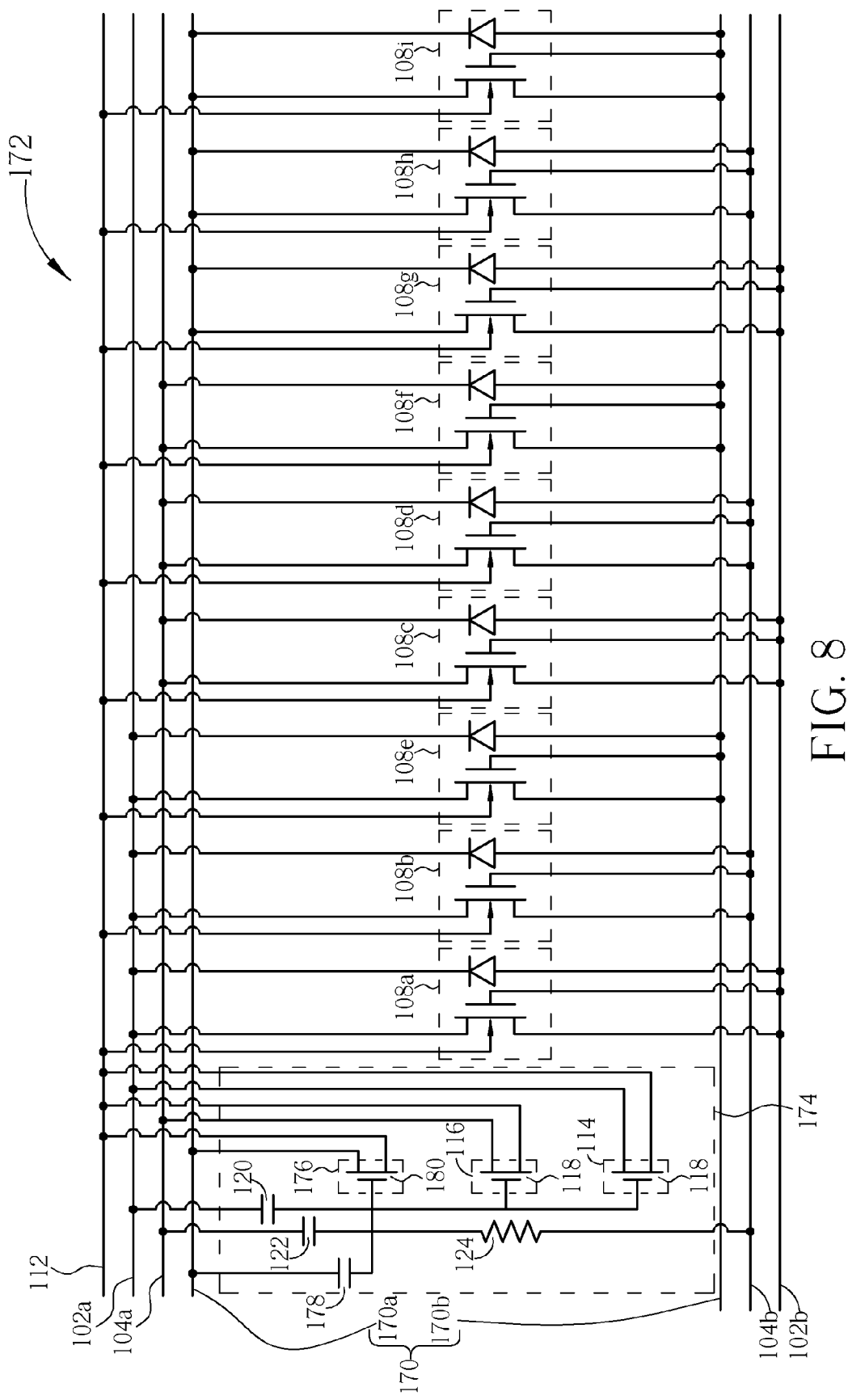
FIG. 8 is a schematic diagram illustrating an ESD protection circuit according to a third preferred embodiment of the present invention.

The present invention is not limited to be only applied to two power sources, and also can be applied to a plurality of power sources. Refer to FIG. 8, which is a schematic diagram illustrating an ESD protection circuit according to a third preferred embodiment of the present invention. As shown in FIG. 8, as compared with the first preferred embodiment, the power sources of this embodiment further includes a third power source 170, and the third power source 170 has a third high power line 170a and a third low power line 170b. In the ESD protection circuit 172 of this embodiment, the ESD detection circuit 174 further includes a third trigger unit 176 and a fourth capacitor 178, and the third trigger unit 176 is a seventh MOS transistor 180. The seventh MOS transistor 180 can be NMOS transistor, but is not limited to this. A gate G of the seventh NMOS transistor 180 is electrically connected to the gates G of the first NMOS transistors 118, and a drain D and a source S of the seventh MOS transistor 180 are electrically connected to the third high power line 170a and the connecting line 112. Furthermore, the fourth capacitor 178 is electrically connected between the gate G of the seventh NMOS transistor 180 and the third high power line 170a. In addition, the power clamp circuits 108 of this embodiment further include a fifth power clamp circuit 108e, a sixth power clamp circuit 108f, a seventh power clamp circuit 108g, an eighth power clamp circuit 108h, and a ninth power clamp circuit 108i, electrically connected between the first high power line 102a and the third low power line 170b, between the second high power line 104a and the third low power line 170b, between the third high power line 170a and the first low power line 102b, between the third high power line 170a and the second low power line 104b and between the third high power line 170a and the third low power line 170b. Each power clamp circuit 108 in this embodiment also includes an NMOS transistor and a diode. Because the difference between the first preferred embodiment and this embodiment is the NMOS transistors and the diodes electrically connected to different high power lines and different low power lines, the electrical connecting method of this embodiment is not detailed redundantly.

In other embodiments of the present invention, the first resistor 124 also can be electrically connected between the gates G of the first NMOS transistors 118 and the first low power line 102b or between the gates G of the first NMOS transistors 118 and the third low power line 170b. Or, besides the first resistor 124 is electrically connected between the gates G of the first NMOS transistors 118 and the second low power line 104b, the ESD detection circuit 106 can further include at least one resistor electrically connected between the gates of the first NMOS transistors 118 and the first low power line 102b or between the gates of the first NMOS transistors 118 and the third low power line 170b. Or, besides the first resistor 124 is electrically connected between the gates G of the first NMOS transistors 118 and the second low power line 104b, the ESD detection circuit 106 can further include two resistors, respectively electrically connected between the gates of the first NMOS transistors 118 and the first low power line 102b and between the gates of the first NMOS transistors 118 and the third low power line 170b.

As the above-mentioned description, as compared with the first preferred embodiment, the number of the power sources of this embodiment increases only one, but the ESD protection circuit requires increasing five power clamp circuits to protect the integrated circuit electrically connected to the power sources.

The ESD protection circuit of this embodiment disposes the ESD detection circuit outside the power clamp circuits, and only further increases a MOS transistor and a capacitor in one ESD detection circuit to trigger on the power clamp circuits. Accordingly, the required area for disposing an ESD detection circuits in each power clamp circuits can be reduced.

In summary, the ESD protection circuit of the present invention disposes one ESD detection circuit outside the power clamp circuits to prevent the size of the integrated circuit from being limited by increasing the number of the power clamp circuits 108.

Those skilled in the art will readily observe that numerous modifications and alterations of the device and method may be made while retaining the teachings of the invention.

What is claimed is:

1. An electrostatic discharge (ESD) protection circuit, electrically connected to at least two power sources, the power sources comprising a first high power line, a first low power line, a second high power line, and a second low power line, and the ESD protection circuit comprising:
    an ESD detection circuit, electrically connected to the first high power line, the second high power line and at least one of the first low power line and the second low power line and used to detect an ESD event occurring in the first high power line and another ESD event occurring in the second high power line, and the ESD detection circuit comprising a first trigger unit, and a second trigger unit, electrically connected to the first high power line and the second high power line respectively, wherein the first trigger unit and the second trigger unit are directly electrically connected to each other; and
    a plurality of power clamp circuits, electrically connected to the power sources, and each power clamp circuit has a trigger node respectively, wherein the trigger nodes are electrically connected to the first trigger unit and the second trigger unit.

2. The ESD protection circuit according to claim 1, wherein the first trigger unit and the second trigger unit are first n-type metal-oxide-semiconductor (NMOS) transistors respectively, gates of the first NMOS transistors are electrically connected to each other, drains of the first NMOS transistors are electrically connected to the first high power line and the second high power line respectively, and sources of the first NMOS transistors are electrically connected to the trigger nodes.

3. The ESD protection circuit according to claim 2, wherein the ESD detection circuit further comprises a first capacitor, a second capacitor, and a first resistor, the first capacitor is electrically connected between the first high power line and the gates of the first NMOS transistors, the second capacitor is electrically connected between the second high power line and the gates of the first NMOS transistors, and the first resistor is electrically connected between the second low power line and the gates of the first NMOS transistors.

4. The ESD protection circuit according to claim 1, wherein the ESD detection circuit further comprises a first diode, and an anode and a cathode of the first diode are electrically connected to the second high power line and the first high power line respectively.

5. The ESD protection circuit according to claim 1, wherein the first trigger unit and the second trigger unit are inverters respectively, and each inverter has an input terminal.

6. The ESD protection circuit according to claim 5, wherein each inverter comprises a p-type metal-oxide-semiconductor (PMOS) transistor and a second NMOS transistor, gates of the PMOS transistors and the gates of the second NMOS transistors are electrically connected to the input terminals, and sources of the PMOS transistors are electrically connected to the first high power line and the second high power line respectively.

7. The ESD protection circuit according to claim 5, wherein the ESD detection circuit further comprises a third capacitor, a second resistor, and a third resistor, the third capacitor is electrically connected between the input terminals and the second low power line, and the second resistor and the third resistor are electrically connected between the first high power line and the input terminals and between the second high power line and the input terminals respectively.

8. The ESD protection circuit according to claim 1, wherein the power clamp circuit comprises:
   a first power clamp circuit, electrically connected between the first high power line and the first low power line;
   a second power clamp circuit, electrically connected between the first high power line and the second low power line;
   a third power clamp circuit, electrically connected between the second high power line and the first low power line; and
   a fourth power clamp circuit, electrically connected between the second high power line and the second low power line.

9. The ESD protection circuit according to claim 8, wherein the first power clamp circuit comprises a third metal-oxide-semiconductor (MOS) transistor and a second diode, the second power clamp circuit comprises a fourth MOS transistor and a third diode, and the third MOS transistor and the fourth MOS transistor are used to tolerate a first voltage provided by the first high power line.

10. The ESD protection circuit according to claim 9, wherein the trigger node of the first power clamp circuit is a body of the third MOS transistor, and the trigger node of the second power clamp circuit is a body of the fourth MOS transistor.

11. The ESD protection circuit according to claim 9, wherein the trigger node of the first power clamp circuit is a gate of the third MOS transistor, and the trigger node of the second power clamp circuit is a gate of the fourth MOS transistor.

12. The ESD protection circuit according to claim 9, wherein a cathode and an anode of the second diode are electrically connected to the first high power line and the first low power line respectively, and a cathode and an anode of the third diode are electrically connected to the first high power line and the second low power line respectively.

13. The ESD protection circuit according to claim 8, wherein the third power clamp circuit comprises a fifth MOS transistor and a fourth diode, the fourth power clamp circuit comprises a sixth MOS transistor and a fifth diode, and the fifth MOS transistor and the sixth MOS transistor are used to tolerate a second voltage provided by the second high power line.

14. The ESD protection circuit according to claim 13, wherein the trigger node of the third power clamp circuit is a body of the fifth MOS transistor, and the trigger node of the fourth power clamp circuit is a body of the sixth MOS transistor.

15. The ESD protection circuit according to claim 13, wherein the trigger node of the third power clamp circuit is a gate of the fifth MOS transistor, and the trigger node of the fourth power clamp circuit is a gate of the sixth MOS transistor.

16. The ESD protection circuit according to claim 13, wherein a cathode and an anode of the fourth diode are electrically connected to the second high power line and the first low power line respectively, and a cathode and an anode of the fifth diode are electrically connected to the second high power line and the second low power line respectively.

17. The ESD protection circuit according to claim 1, further comprising a connecting line, electrically connecting the ESD detection circuit and the trigger nodes.

18. The ESD protection circuit according to claim 1, wherein the at least two power sources further comprises a third high power line and a third low power line, and the ESD detection circuit further comprises a third trigger unit, electrically connected to the third high power line and the trigger nodes.

* * * * *